Patented Jan. 20, 1953

2,626,248

UNITED STATES PATENT OFFICE 2,626,248

METHOD OF REPLASTICIZING POLYMERIC METALLO-CARBOXYLATES

Harold P. Brown, Akron, Ohio, assignor to The B. F. Goodrich Company, New York, N. Y., a corporation of New York No Drawing. Application November 24, 1950, Serial No. 197,498

13 Claims. (Cl. 260—2.3)

The present invention relates to the replasticizing or conversion from the strong elastic state to a plastic or workable state of polymeric metallo-carboxylates formed by polymeric condensation reactions involving free carboxyl groups present in the structure of a rubbery material and the polyvalent cation of a polyvalent metallic oxide curing or elasticizing agent.

In my copending related application, Serial No. 193,521, filed November 1, 1950, I disclose that elastic synthetic rubber condensation products of unusual and highly advantageous properties are secured by first preparing a plastic rubbery open-chain aliphatic conjugated diene polymer containing a controlled amount, from 0.001 to 0.30 chemical equivalents by weight for each 100 parts by weight of rubbery polymer, that is, from 0.045 to 13.5% by weight of the rubbery polymer of free carboxyl (—COOH) groups, and then condensing the carboxyl-containing plastic rubbery polymer with a polyvalent metallic oxide whereby elasticization of the plastic polymer occurs by reason of a salt-forming polymeric condensation reaction (termed herein "elasto-condensation") involving the carboxyl groups of the polymer and the polyvalent cation of the curing agent and resulting in an elastic polymeric metallo-carboxylate. Other copending applications Serial Nos. 193,522, 193,523, 197,524, 197,496, and 197,497, describe the preparation of other somewhat similar elastic polymeric metallo-carboxylates.

I have now discovered that such elastic rubbery polymeric metallo-carboxylates may be reclaimed that is, they may be rendered truly plastic, by a process which comprises first grinding or refining the elastic or cured composition as, for example, in a tight mill thereby converting it to a crumbly mass or a powder, and second, adding a quantity of a carboxylic acid or anhydride thereto and masticating until a smooth plastic composition is obtained. By this process, the rough, crumbly mass of refined polymer becomes cohesive, plastic, and often taffy-like in consistency. Since remolding and reheating of the reclaimed composition does not reestablish any substantial proportion of its former strength it is seen that the organic acid actually destroys the linkages between the polymer chains responsible for the elasticized condition.

The polymeric metallo-carboxylates suitable for use in the replasticizing process of this invention are characterized in that they are strong, elastic polymeric materials comprising predominantly linear carbon chains connected by metallo-carboxylate linkages which may be visualized and illustrated by the structure

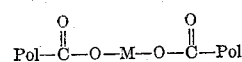

where Pol represents the linear polymer chain and M represents a polyvalent metal atom. The polymeric metallo-carboxylates may be prepared from any polymeric material, which is plastic and rubbery and contains predominantly linear polymer chains to which are attached a controlled amount of carboxyl (—COOH) groups, by the addition of a polyvalent metal oxide followed by heating until salt formation occurs between the metallic cation of the metallic oxide and the carboxyl groups of the polymeric material. The polymeric metallo-carboxylates may be prepared, for example, from a plastic interpolymer formed by the interpolymerization in an acidic aqueous medium of a monomeric mixture comprising at least 50% by weight of an open-chain, aliphatic conjugated diene and equal or lesser proportions of an olefinically-unsaturated carboxylic acid, as disclosed in copending application Serial No. 193,521.

Polymeric metallo-carboxylates are also prepared from a plastic, rubbery carboxyl-containing interpolymer resulting from the interpolymerization in an acidic aqueous medium of a monomeric mixture comprising an alkyl acrylate and an olefinically-unsaturated carboxylic acid. Such metallo-carboxylates are described in greater detail in the copending application of Earl J. Carlson, Serial No. 197,524, filed November 24, 1950.

Another method of preparing plastic, carboxyl-containing rubbery polymers easily convertible to strong, elastic polymeric metallo-carboxylates, consists in the reaction of a carboxylating or carboxyl-supplying agent such as maleic acid or a mercapto-carboxylic acid such as thioglycollic acid or anhydride thereof, with a plastic polymer of an open-chain, aliphatic conjugated diene (preferably a polymer of a butadiene-1,3 hydrocarbon) not containing carboxyl groups, preferably in the presence of a peroxygen catalyst, thereby to produce by reaction of the polymer with the carboxyl-supplying reagent a plastic rubbery polymer containing combined carboxyl groups. This third method is described in greater detail in my copending application Serial No. 193,522, filed November 1, 1950.

A fourth method of preparing plastic, carboxyl-containing rubbery materials convertible to polymeric metallo-carboxylates involves the reaction with a hydrolyzing agent of a plastic, rubbery interpolymer of an open-chain, aliphatic conjugated diene (preferably a butadiene-1,3 hydrocarbon) with an unsaturated copolymerizable material containing a group hydrolyzable to a carboxyl group, such as an unsaturated nitrile (acrylonitrile, for example), ester (an alkyl acrylate or alkacrylate, for example), amide (acrylamide, for example) or others thereby to hydrolyze a portion of the hydrolyzable groups and produce a plastic, rubbery polymer containing combined carboxyl groups. This fourth method is described in my copending application, Serial No. 193,523, filed November 1, 1950.

A fifth method, closely related to the hydrolysis method described above, involves the treating of a plastic, rubbery polymer of an alkyl acrylate such as ethyl acrylate, with a hydrolysis agent thereby to produce a plastic, rubbery carboxyl-containing acrylic polymer. This fifth method is more clearly described in my copending application, Serial No. 197,496, filed November 24, 1950.

A sixth method of preparing plastic carboxyl-containing rubbery materials convertible to polymeric metallo-carboxylates, disclosed in my copending application Serial No. 197,497, involves the copolymerization of a major amount of an isoolefin such as isobutylene with a subordinate amount of an alpha-beta unsaturated acid chloride such as acrylyl chloride, followed by hydrolysis of the acid chloride group to carboxyl groups.

The open-chain, aliphatic conjugated dienes suitable for use in any of the foregoing-described methods involving carboxyl-containing diene polymers include the butadiene-1,3 hydrocarbons such as butadiene-1,3 itself, 2-methyl butadiene-1,3 (isoprene), 2,3-dimethyl butadiene-1,3, piperylene, 2-neopentyl butadiene-1,3, and other hydrocarbon homologs of butadiene-1,3 and in addition the substituted dienes such as 2-chloro butadiene-1,3, 2-cyano butadiene-1,3, the straight chain conjugated pentadienes, the straight- and branch-chain conjugated hexadienes and others. The butadiene-1,3 hydrocarbons and butadiene-1,3 in particular, because of their ability to produce stronger and more desirable polymers are much preferred.

The olefinically-unsaturated carboxylic acids which are copolymerized in any of the foregoing-described processes involving copolymerization are characterized by possessing one or more olefinic carbon-to-carbon double bonds and one or more carboxyl groups, that is, monocarboxy and polycarboxy, mono-olefinic and polyolefinic acids including, for example, such widely divergent materials as acrylic acid, the alpha-alkyl acrylic acids, crotonic acid, beta-acryloxy propionic acid, alpha- and beta-vinyl acrylic acid, alpha-beta-isopropylidene propionic acid, sorbic acid, cinnamic acid, maleic acid, oleic acid, undecylenic acid, ricinoleic acid, linoleic acid, linolenic acid and others.

It is preferred to employ one or more olefinically-unsaturated carboxylic acids containing at least one activated olefinic carbon-to-carbon double bond, that is, an acid containing an olefinic double bond which readily functions in an addition polymerization reaction because of the olefinic double bond being present in the monomer molecule either in the alpha-beta position with respect to the carboxyl group thusly

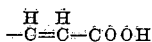

or attached to a terminal methylene grouping thusly $CH_2=C<$. In the alpha-beta unsaturated carboxylic acids the close proximity of the strongly polar carboxyl group to the double-bonded carbon atoms has a strong activating influence rendering the substances containing this structure very readily polymerizable. Likewise, when an olefinic double bond is present attached to a terminal methylene grouping, the methylenic hydrogen atoms are very reactive making the double bonded carbon atoms readily enter into polymerization reactions.

Illustrative alpha-beta unsaturated carboxylic acids within the above-described preferred class include crotonic acid, alpha-butyl crotonic acid, angelic acid, hydrosorbic acid, cinnamic acid, m-chloro cinnamic acid, p-chloro cinnamic acid, umbellic acid, beta-methyl acrylic acid (isocrotonic acid or 2-butenoic acid) and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-, beta-, or gamma-, epsilon-dimethyl sorbic acid, beta-(2-butenyl) acrylic acid (2,4-heptadiene-oic-1), 2,4 - pentadienoic acid, 2,4,6-octatrienoic acid, 2,4,6,8-decatetrienoic acid, 1-carboxy-1-ethyl-4-phenyl butadiene-1,3, 2,6-dimethyl decatriene-(2,6,8)-oic-10, alpha-beta-isopropylidene propionic acid having the structure

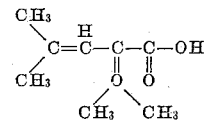

alpha-vinyl cinnamic acid, alpha-isopropenyl-furfural acetic acid, alpha-isopropenyl-cinnamenyl acrylic acid, and other polyolefinic monocarboxylic acids; maleic acid, fumaric acid, hydromuconic acid, glutaconic acid, and other monoolefinic polycarboxylic acids; 3-carboxy-pentadiene-(2,4)-oic-1, muconic acid, and other polyolefinic polycarboxylic acids.

Olefinically unsaturated carboxylic acids containing the $CH_2=C<$ grouping include acrylic acid, alpha-chloro acrylic acid, methacrylic acid, ethacrylic acid, alpha-isopropylidene acrylic acid, alpha-styryl acrylic acid (2-carboxy-4-phenyl butadiene-1,3), beta-vinyl acrylic acid (1-carboxy butadiene-1,3), alpha-vinyl acrylic acid, beta-acryloxy propionic acid, beta acryloxy acetic acid and others.

Best polymers for production of elastic polymeric metallo-carboxylates, are obtained by interpolymerizing, with a diene particularly, a monoolefinic monocarboxylic acid having its olefinic double bond in alpha-beta position to the carboxyl group and also containing a terminal methylene group, such as the acrylic and alkacrylic acids including acrylic acid, methacrylic acid, ethacrylic acid and the like and other acids of this structure listed above.

The proportions of the essential monomeric material (i. e., the diene and olefinically-unsaturated carboxylic acid) in the monomeric mixture may be varied according to the type of polymer desired. It has been discovered that replacement of, for example, butadiene-1,3 with as little as 1% or less by weight of interpolymerized acid in the preparation of polybutadiene produces a polymeric metallo-carboxylate possessed of a tensile strength from 200 to 1,000 lbs./sq. in. higher than similarly cured polybutadiene. As the amount of olefinically-unsaturated acid in the monomeric mixture (and consequently in the polymer) is increased the tensile strength of the polymeric metallocarboxylate obtained there-from is increased but the ease of working of the unelasticized polymer is decreased. It is therefore preferred, for obtaining plastic easily-worked rubbery materials, to employ monomer mixtures containing in the range of 1 to 30% by weight of the acid component. When only the diene and acid are interpolymerized, for example, this means, of course, that the proportion of the former will be in the range of 70 to 99% by weight. Other monomeric materials such as vinylidene chloride, styrene, vinyl naphthalene, acrylonitrile, alkyl acrylates, alkyl alkacrylates, vinyl pyridine, isobutylene, and others may be utilized in greater or lesser proportion. Tripolymers and other multi-component polymers having excellent properties when condensed with a polyvalent metal oxide may be produced from monomeric mixtures containing from 50 to 94% by weight of the conjugated diene, from 1 to 45%, more preferably 2 to 30%, by weight of the unsaturated acid, and from 5 to 40% by weight of one or more than one of the other monoolefinic monomers.

A more precise method of defining the carboxyl-containing polymers resulting from any of the above-described six methods is in terms of their carboxyl (—COOH) content. Since the percentage of unsaturated acid in the monomeric mixture employed in any of the polymerization processes or the percentage of hydrolyzing or carboxylating agents employed in any of the processes wherein carboxyl is introduced into a polymer, is seldom indicative of the carboxyl content of the final polymer obtained, the polymers will be defined herein in terms of chemical equivalents (by weight) of carboxyl (—COOH) per 100 parts by weight of polymer rubber and will be sometimes referred to by the designation E. P. H. R. ("equivalents per hundred rubber"). The latter value is easily determined, for example, by titration of a polymer solution with alcoholic KOH to a phenolphthalein end-point. The polymers containing from 0.001 to 0.30 E. P. H. R. of carboxyl (—COOH) per 100 parts by weight of rubber are predominantly plastic in nature and are adapted to produce rubbery elastic compositions when condensed with a polyvalent metal oxide. Polymers containing from 0.02 to 0.20 E. P. H. R. of carboxyl are preferred for the production of elastic compositions having the best balance of properties while those containing from 0.02 to 0.10 E. P. H. R. of carboxyl are preferred for the production of strong elastic compositions having most excellent low temperature flexibility.

With the above explanation of the nature of the elastic rubbery polymeric metallo-carboxylates utilizable in the present invention, the more detailed practice of the present invention will now be described.

As mentioned above in a general way, in the practice of this invention the elastic polymeric metallo-carboxylate is usually first broken down or subdivided such as by passing it several times through the rolls of a mill having cooled and tightly spaced rolls (a step known as "refining"), or by grinding, granulation and the like before adding the organic acid "reclaiming" agent. After addition of the organic acid mastication or milling of the mass is continued until it is plastic. At first, the rough crumbly mass is difficult to handle, because it falls off the mill, but as the temperature is raised and the organic acid is worked in, a gradual transformation is noted, first a rough band being formed having no tendency to adhere and then finally the mass smooths out and begins to adhere to the mill rolls. It may then be removed from the mill and stored. Remolding under heat of the plastic mass does not reestablish any substantial portion of the original strength of the elastic polymeric metallo-carboxylate.

Any of the various carboxylic acids and carboxylic acid anhydrides including those which are monobasic and polybasic and those which are aliphatic and cyclic, whether aromatic, alicyclic or heterocyclic, are utilizable as "reclaiming" agents. Mixtures of several different acids and/or anhydrides are also utilizable, sometimes with improved results. Illustrative compounds within this class include formic acid, acetic acid, butyric acid, caproic acid, caprylic acid, lauric acid, myristic acid, palmitic acid, stearic acid (preferred), nonadecanoic acid, behenic acid and other saturated aliphatic monocarboxylic acids and mixtures thereof; acrylic acid, furyl acrylic acid, metacrylic acid, crotonic acid, oleic acid, linoleic acid, ricinoleic acid, sorbic acid, and other unsaturated monocarboxylic acids; oxalic acid, malonic acid, succinic acid, glutaric acid, adipic acid, suberic acid, azelaic acid, sebacic acid (preferred), tricarballylic acid, citric acid, 3,7-dithia nonanedioc acid, 4,-dithia-6-oxahendecanedioc acid, and other saturated aliphatic dicarboxylic and polycarboxylic acids; maleic and fumaric acids, malic acid, glutaconic acid, muconic acid, and other unsaturated aliphatic di- and polycarboxylic acids, benzoic acid, chlorobenzoic acid, p-aminobenzoic acid, o-aminobenzoic acid, phenylacetic acid, cinnamic acid, the toluic acids, napthoic acid, cyclohexane acetic acid, furoic acid, and other monocarboxylic aromatic, alicyclic and heterocyclic acids; phthalic acid, the cholorophthalic acids, isophthalic acid, 4-sulfophthalic acid, terephthalic acid, tetrahydrophthalic acid, hemimellitic acid, trimellitic acid, trimeric acid, naphthalic acid, cyclohexane diacetic acid, 2,2'-bis-(4-carboxymethylphenyl) propane, and other polycarboxylic carbocyclic (aromatic) and cyclic acids; and the anhydrides of the above and other organic acids such as acetic anhydride, propionic anhydride, butyric anhydride, valeric anhydride, succinic anhydride, maleic anhydride, benzoic anhydride, phthalic anhydride (preferred), the chlorophthalic anhydrides, tetrahydrophthalic anhydride, naphthalic anhydride, cinnamic anhydride, furoic anhydride, and other aliphatic, aromatic, alicyclic and heterocyclic carboxylic acid anhydrides. In addition, polymeric acids such as polyacrylic acid and polymethacrylic acid and complex acids and mixtures of acids from natural sources such as soybean fatty acids, pectic acid, rosin acids and others, have been found to be operable. It should be noted, however, that the carboxyl content of the acidic "reclaiming" agent is greater than that of the carboxyl-containing polymer, that is, it is greater than 0.045 to 13.5% by weight.

The amount of organic acid or anhydride reclaiming or replasticizing agent is not critical, for the amount utilized may be varied considerably while obtaining a plastic material. However, to obtain a plastic reclaimed composition which does not recover a large share of its elastic properties upon long standing or upon being heated during remastication, remolding and the like, it has been found that an empirical relationship exists between the amount of polyvalent metallic oxide utilized in the production of the original polymeric metallo-carboxylate and the amount of acidic reclaiming agent required. While the amount required will vary slightly with the agent utilized, it has been found that in general from 0.75 to 2.0 chemical equivalent weights of acidic reclaiming agent (in the polycarboxylic reclaiming agents each (—COOH) group is considered potentially able to function in the reclaiming reaction) for every chemical equivalent weight of polyvalent metallic oxide present combined with the rubber or as excess metallic oxide. However, if the elastic polymeric metallo-carboxylate is to be replasticized or reclaimed and then recompounded for reuse in one operation, smaller amounts will be found to impart a temporary plasticity which endures sufficiently long for the subsequent processing steps required. For the latter purpose, from 0.25 to 1.50 chemical equivalents of acidic reclaiming agent generally will be found sufficient.

The replasticization of polymeric metallo-carboxylates according to this invention will be more clearly demonstrated in the following specific examples which are intended merely as illustrations of the invention and not as limitations on the scope thereof.

EXAMPLE 1

A synthetic rubbery interpolymer is prepared by the polymerization of the monomeric materials contained in a reaction mixture having the following composition:

| Material: | Parts/Wt. |
|---|---|
| Butadiene-1,3 | 88.0 |
| Sorbic acid | 12.0 |
| Dodecylamine (90% neutralized with HCl) | 5.0 |
| t-Dodecyl mercaptan | 0.4 |
| Potassium persulfate | 0.2 |
| Aluminum chloride | 0.2 |

The reaction is carried out at 40° C. to produce an interpolymer containing 0.087 E. P. H. R. of (—COOH) (Sample A of Table I). The solid interpolymer is first formed into a smooth sheet on a rubber mill and 12 parts of zinc oxide (0.296 E. P. H. R.) and 15 parts (.0527 E. P. H. R.) of stearic acid per 100 parts of rubber incorporated therein. The resulting plastic mixture is press molded for 40 minutes at 300° F. to produce a pure gum polymeric metallo-carboxylate (Sample B of Table I) having a tensile strength of 2900 lbs./sq. in., a modulus of 300% elongation of 1445 lbs./sq. in., and an ultimate elongation of 400%.

One hundred parts by weight of the polymeric metallo-carboxylate is passed through a rubber mill the rolls of which were tightly spaced and cooled below 50° C. A crumbly, very loose and weak mass is formed. The crumbly mass is divided into 10 equal portions of 12.7 parts by weight each one of which is remolded for 40 minutes at 300° F. (Sample C). Another portion of 12.7 parts, containing 10 parts by weight of polymer is milled with one quarter of the amount of stearic acid theoretically required to react with the zinc oxide in excess of stearic acid $$\left(\frac{0.296-0.053}{4\times10}=0.0066 \text{ E. P. H. R. or } 1.72 \text{ parts}\right)$$

The weak crumbly mass forms an adhering band which is easily cut back and forth on the mill. The material of the band is obviously partially replasticized. To the band of rubbery material on the rolls another 1.72 parts( a total of ½ theory) of stearic acid are added. The band became much stickier, smoother and could be pulled out in "legs." Remolding of the resultant plastic material formed a smooth, clear sheet of rubbery material having considerable strength (Sample D). Addition of zinc oxide and stearic acid to the latter material and remolding does not substantially improve its properties (E). Another portion of the original crumbly mass is treated with 0.243 E. P. H. R. of stearic acid (theory) or 6.9 parts. The crumbly mass becomes quite sticky after the stearic acids is incorporated. One portion of the sticky plastic mass is remolded to yield a weak, soft sheet (Sample F) and another is compounded with 12 P. H. R. of zinc oxide 15 P. H. R. of stearic acid and remolded to form a strong elastic composition (Sample G). Table I below lists the results of physical evaluation of the various described samples.

*Table I*

| Sample | Description | Reagent, P. H. R. | Added. E.P.H.R. | Physical Properites | | |
|---|---|---|---|---|---|---|
| | | | | Tensile | 300% Modulus | E |
| (A) | Original Raw Rubber | | | 20 | | 1,620+ |
| (B) | Original polymeric metallo, carboxylate: | | | | | |
| | Zinc oxide | 12 | 0.246 | 2,900 | 1,445 | 400 |
| | Stearic acid | 15 | 0.053 | | | |
| (C) | Weekly crumbly mass obtained by refining (B)—remolded | | | 4,100 | 1,210 | 540 |
| (D) | (C)+½—Theory Stearic Acid—remolded | 3.44 | 0.122 | 2,690 | 700 | 640 |
| (E) | Sample (D) plus: | | | | | |
| | Zinc oxide | 12 | 0.296 | 2,700 | 1,090 | 560 |
| | Stearic acid | 15 | 0.053 | | | |
| (F) | (C)+Theory of Stearic Acid | 6.9 | 0.243 | 50 | | 1,620+ |
| (G) | Sample (F) plus: | | | | | |
| | Zinc oxide | 12 | 0.296 | 2,010 | 1,480 | 500 |
| | Stearic acid | 15 | 0.053 | | | |

It is obvious that the use of ¼ to ½ theory of stearic acid accomplishes only a temporary replasticization of the polymeric metallo-carboxylate for Sample D, when remolded, regains substantially all its elastic properties. Sample F, however, shows that when a full theoretical amount of acid is utilized, remolding of the plastic reclaim does not reestablish the elastic properties.

EXAMPLE 2

Still another portion of the rough crumbly mass resulting from the refining of the polymeric metallo-carboxylate of Example 1 is treated with 10.9 parts (theory) of oxalic acid per 100 grams of rubber or 1.09 parts by weight for a 12.7 parts of sample of refined material (a chemical equivalent weight). The material on the mill is at first very dry and rough but then smooths out to form a good clear band which adheres well to the fast roll and which is easily sheeted off the mill. Remolding of the plastic material for 40 minutes at 300° F. forms a very weak sheet which shows obvious signs of complete replasticization. When 1.0 gram of stearic acid and 0.8 gram of zinc oxide are added to 9.1 grams of the replasticized stock and the resultant composition molded for 40 minutes at 300° F. a strong elastic product is obtained. The use of 1.5 times the theoretical quantity of oxalic acid yields a smooth dry band that is easily removed from the rolls and does not regain its strength on remolding or storage.

EXAMPLE 3

When a theoretical amount (0.243 E. P. H. R.) of citric acid or 15.57 P. H. R. of citric acid (1.56 parts to 12.7 parts of sample) is milled into the rough crumbly refined material of Example 1 the material forms very dry crumbs at first, then begins to form a band. When all the citric acid is thoroughly dispersed in the rubber, a slightly sticky plastic band is formed. A remolded sample of the latter material has a tensile strength of only 40 lbs./sq. in. and an elongation of 500% showing that the sample is completely replasticized. The material obtained after remolding is very smooth and almost transparent. When the excess stock is allowed to stand it retains its putty-like consistency.

EXAMPLE 4

The process of Examples 2 and 3 is repeated utilizing further portions of the refined metallo-carboxylate of Example 2 along with a theoretical quantity of phthalic anhydride (1.8 parts by weight to 12.7 parts of sample). The rough crumbly mass is soon converted to a smooth, non-adhering band. When remolded, the phthalic anhydride reclaim is smooth, semi-transparent, slightly sticky and is very weak. The addition of 12 P. H. R. of zinc oxide and 15 P. H. R. of stearic acid to the plastic reclaim yields a strong elastic polymeric metallo-carboxylate having a tensile strength of 4200 lbs./sq. in., a 300% modulus of 1700 lbs./sq. in. and an elongation of 540%.

EXAMPLE 5

A copolymer is made from a monomeric mixture consiting of 91.4% butadiene-1,3 and 8.6% methacrylic acid and containing 0.10 E. P. H. R. of (—COOH). Compounding of the copolymer with 11 P. H. R. of zinc oxide, 4 P. H. R. of phthalic anhydride, and 30 P. H. R. of channel black and molding for 20 minutes at 300° F. yields a polymeric metallo-carboxylate having a tensile strength of 5400 lbs./sq. in. and an elongation of 210%. When finely ground the material shows no tendency to form a band on a rubber mill and when remolded the material exhibits a tensile strength of 2350 lbs./sq. in. and an elongation of 180%. The incorporation into the rough crumbly mass of 1.54 parts by weight of stearic acid for every 14.5 parts by weight of sample produces a very dry rough band that showed no tendency to adhere to the rolls. The incorporation of a second portion of 1.54 parts of stearic acid made the band less dry and more cohesive, the material on the rolls appearing to be well massed and which could be sheeted easily from the rolls, but it was still rough in appearance. Addition of a third similar portion of acid made the material smooth and adherent. Addition of a fourth portion of acid made the material very plastic and sticky. A remolded sheet of the final composition was plastic and very smooth and shiny.

The polymeric metallo-carboxylate prepared from the butadiene methacrylic acid copolymer of this example is efficiently plasticized by 13.96 P. H. R. of citric acid, 16.15 P. H. R. of phthalic anhydride, or 13.7 P. H. R. of oxalic acid to yield millable and moldable compositions

EXAMPLE 6

A tripolymer which contains 0.099 E. P. H. R. of (COOH) is made in a recipe similar to that of Example 1 from a monomeric mixture consisting of 55% by weight of butadiene-1,3, 35% acrylonitrile, and 10% methacrylic acid. When compounded with 15 P. H. R. of zinc oxide and 4 P. H. R. of phthalic anhydride and molded 40 minutes at 300° F. a strong elastic metallo-carboxylate is obtained having a tensile strength of 8880 lbs./sq. in., a 300% modulus of 4360 lbs./sq. in. and an elongation of 420%.

The polymeric metallo-carboxylate when passed through a tight cool mill yields a rough non-adhering band. The use of ¾ to 1.0 equivalent weight or 0.37—0.054=0.316 E. P. H. R. of stearic acid, oxalic acid, phthalic anhydride, citric acid, or other acid yields a workable composition having only a small portion of its original strength. Addition of zinc oxide and an organic acidic controller to the reclaimed rubbery material and remolding for 40 minutes at 300° F. yields a smooth, clear and strong polymeric metallo-carboxylate very similar to the properties of the original polymeric metallo-carboxylate.

EXAMPLE 7

A copolymer of butadiene-1,3 and methyl methacrylate is prepared by the polymerization of the monomeric materials contained in a reaction medium having the following proportions:

| Material: | Parts/Wt. |
|---|---|
| Butadiene-1,3 | 90.0 |
| Methyl methacrylate | 10.0 |
| Fatty acid soap flakes | 5.0 |
| [1]Emulsifier #2 | 1.0 |
| Potassium persulfate | 0.3 |
| Tertiary dodecyl mercaptan | 0.1 |
| Water | 200.0 |

[1] Sodium salts of polymerized alkyl naphthalene sulfonic acids.

The polymerization is conducted at 50° C. The resulting polymer latex is short-stopped by the addition of 0.1% on the polymer of hydroquinone after about 90 to 95% of the monomers have polymerized. The latex is then stabilized by the addition of an aqueous dispersion containing 1.5% by weight on the polymer of phenyl beta-naphthylamine.

The finished latex containing a small quantity of unreacted methyl methacrylate is placed in an autoclave and 2N sodium hydroxide added slowly thereto until a total of 0.44 mole per mole of

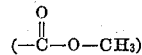

present in the polymer are added. The reaction vessel is then closed and heated to a temperature of 110° C. with agitation for six hours. The strongly alkaline latex is cooled to 45 to 55° C. and then is acidified by addition of hydrochloric acid to a pH between 1.0 and 1.5. The acidification results in coagulation of the latex. The coagulum is then suspended in several volumes of acidulated water (pH 1.0 to 1.5) and heated for five or ten minutes at 60 to 70° C. The latter treatment is again repeated and the coagulum then freed of acid by several warm water washes at 50 to 60° C. and dried in an air oven at 60° C. The carboxyl content of the resultant plastic hydrolyzed copolymer is found to be 0.11 E. P. H. R. of carboxyl.

To the hydrolyzed copolymer, there are added on a rubber mill 8 P. H. R. of zinc oxide and the resultant plastic mixture heated for 60 minutes at 326° F. The product is found to have a tensile strength of 3660 lbs./sq. in., a modulus at 300% elongation of 2060 lbs./sq. in. and an ultimate elongation of 410%. The elasticized product is then passed several times through a tight cold rubber mill and a loose, crumbly and rough mass obtained evidencing little tendency to stick together or adhere to the mill rolls. However, when 31.24 P. H. R. of stearic acid are incorporated (a chemical equivalent weight) a plastic, smooth and cohesive mass is formed which adheres to the mill roll and is easily sheeted off. Remolding of the plastic composition produces a weak plastic sheet.

EXAMPLE 8

A copolymer produced by the emulsion polymerization of 55 parts by weight of butadiene-1,3 and 45 parts of acrylonitrile (known commercially as Hycar OR–15) is utilized in the production of a carboxyl-containing reaction product. To 60 grams of the copolymer dissolved in 600 cc. of benzene there are added 2.9 grams of benzoyl peroxide and 19.08 grams of beta-mercapto propionic acid. The reaction mixture is agitated at 50° C. for 24 hours to produce a product containing 0.119 E. P. H. R. of (—COOH). Upon being admixed with 10 P. H. R. of zinc oxide and heated for 40 minutes at 300° F., an elastic polymeric metallo-carboxylate is produced having a tensile strength of 1270 lbs./sq. in. and an elongation of 620%. A theoretical quantity of phthalic anhydride efficiently replasticizes the cured or elasticized composition.

EXAMPLE 9

A polybutadiene synthetic rubber made by the polymerization in aqueous emulsion of butadiene-1,3 is utilized in the method of Example 8 to produce a carboxyl-containing reaction product. The carboxylation is carried out by adding 1.5 gms. of benzoyl peroxide and 9.2 gms. of thioglycollic acid to a solution of 60 gms. of polybutadiene in 600 cc. of benzene. The resulting mixture is heated at 50° C. for 24 hours to obtain a product containing 0.07 E. P. H. R. of (—COOH). The polybutadiene thioglycollic acid adduct is mixed with 10 P. H. R. of zinc oxide and pressmolded for 40 minutes at 300° F. The resulting polymeric metallo-carboxylate is a strong, clear gum composition having a tensile strength of 1120 lbs./sq. in., a modulus of 620 lbs./sq. in., and an ultimate elongation of 445%. A quantity of phthalic anhydride equivalent to 10 P. H. R. of zinc oxide converts the polymeric metallo-carboxylate to a plastic, easily-worked composition.

EXAMPLE 10

A tripolymer is made by first preparing a soap solution containing 10.88 gms. of dodecylamine hydrochloride (amine 100% neutralized with HCl) in 1566 gms. of water. To this soap solution in a reaction vessel fitted with a reflux condenser there is added a mixture of monomers consisting of 374 gms. of ethyl acrylate, 11.15 gms. of acrylic acid, and 14.84 gms. of methacrylic acid, the vessel sealed and evacuated, and its contents heated to 80° C. A catalyst solution consisting of 0.428 gm. of potassium persulfate in 200 cc. of water is prepared and added at a rate 3.0 milligrams of potassium persulfate per hour. In three hours a total of 10 cc. of catalyst solution is added, the temperature of the reaction increasing from 80 to 95° C. at the end of 3 hours at which point the reaction is 80% complete. The acidic aqueous polymer dispersion is coagulated with alcohol, the resulting coagulum washed several times with 3% HCl solution and then several times with clear water. The dried coagulum is plastic and is found to contain 0.089 E. P. H. R. of (—COOH). When mixed with 10 P. H. R. of zinc oxide and heated under pressure in a press mold for 40 minutes at 270° F., the plastic coagulum is converted to an elastic polymeric metallo-carboxylate having a tensile strength of 2770 lbs./sq. in., an elongation of 380%, and a 300% modulus of 2020 lbs./sq. in.

The polymeric metallo-carboxylate of Example 9 is first passed through the rolls of a tight cold mill until a loose crumbly sheet is formed. To the loose crumbly material there is added a weight of stearic acid chemically equivalent to 10 P. H. R. of zinc oxide and the milling continued. The crumbly sheet becomes plastic and slightly sticky upon addition of the stearic acid. When removed from the rolls the plastic sheet is smooth and shiny and possesses little strength. The sheet material does not recover its strength when stored for a lengthy period or when remolded in a press at 270° F.

EXAMPLE 11

A polyethylacrylate polymer prepared by the polymerization of ethyl acrylate in alkaline aqueous emulsion is dissolved in a sufficient quantity of a benzene ethyl alcohol solvent mixture (3:1) to make a 5% solution. To the resulting solution in an autoclave 0.15 chemical equivalents by weight of potassium hydroxide per 100 parts of polymer are added, the vessel closed, and its contents agitated for 5 hours at 50° C. The solution is then made acid to a pH of about 1.5 by the addition of HCl. The polymer is then precipitated by addition of an equal volume of hexane and the precipitate freed of solvent by air drying at 55° C. The resultant polymer is found to contain 0.11 E. P. H. R. of (—COOH). When the polymer is admixed on a plastic mill with 8.0 P. H. R. of zinc oxide and heated in a press mold for 60 minutes at 270° F., an elastic polymeric metallo-carboxylate is obtained having a tensile strength of 3100 lbs./sq. in. When the latter metallo-carboxylate is refined and a weight of stearic acid equivalent to 8.0 P. H. R. of zinc oxide is added on the mill rolls, a smooth, plastic composition is obtained giving every evidence of being completely replasticized.

EXAMPLE 12

A rubbery isobutylene acrylyl chloride polymer is prepared by polymerizing the monomeric materials in solution in ethyl chloride in the presence of a Friedel-Crafts type catalyst at temperatures of —100° C. or lower. First, a mixture of 1.0 mole (56 parts/wt.) of isobutylene and 0.2 mole (18.0 parts/wt.) of acrylyl chloride is dissolved in anhydrous ethyl chloride. Then a catalyst solution consisting of 1.25 gms. of anhydrous aluminum chloride dissolved in 250 gms. of anhydrous ethyl chloride is prepared. The monomer solution is slowly added to the catalyst solution to bring about reaction. The reaction is substantially complete in 10 minutes or less at a temperature of −100° C. or lower. The polymer is separated from the liquid components of the reaction medium and quenched in a water bath at a temperature of 0 to 10° C. The resulting crumb-like coagulum is separated from the aqueous phase by screening and then washed with clear water until the wash water is free of chloride ion. The washed coagulum or hydrolyzed isobutylene acrylyl copolymer is then placed in a Brabender internal mixer and masticated at a temperature of 70 to 75° C. under vacuum until a dry slighty sticky mass is obtained. The product is found to contain 0.04 E. P. H. R. of carboxyl (or 2.8% acid as acrylic acid) and to possess a molecular weight of at least 250,000. When the rubbery, plastic polymer is mixed with 5.0 P. H. R. of zinc axide and 18.5 P. H. R. of stearic acid and heated for 40 minutes at 280° F. an elastic polymeric metallo-carboxylate is obtained having a tensile strength in excess of 3,000 lbs./sq. in. When the strongly elastic polymeric metallo-carboxylate is first refined and then mixed with a chemical equivalent weight of stearic acid a smooth plastic material is obtained. The latter plastic reclaimed material may be re-elasticized by the addition of zinc oxide and remolding under heat and pressure.

The various replasticized products produced by the processes ilustrated in the foregoing examples are useful for most of the uses in which sulfur-vulcanized natural and synthetic rubbers are utilized and in addition their extreme plasticity, tack and all-around processability make them especially suitable to the production of calendered films, sheetings etc. and to the production by extrusion and the like of shaped articles such as tubing, channels, etc. In addition, since the replasticized compositions may be re-elasticized by addition of suitable amounts of a polyvalent metallic oxide and heating for a prescribed time and compositions obtained having outstanding strength, they are adapted for use where ordinary rubbery materials fail because of their inferior strength.

Although the invention has been illustrated by the foregoing examples, it is to be understood that the invention is not limited thereto and that numerous variations and modifications which will be obvious to those skilled in the art are within the spirit and scope of the invention as defined by the appended claims.

I claim:

1. The method of replasticizing an elastic polymeric metallo-carboxylate prepared by the reaction of a polyvalent metal oxide with a plastic, predominantly linear, carboxyl-containing polymer containing from 0.001 to 0.30 chemical equivalents by weight of combined —COOH per 100 parts by weight of polymer, which comprises mixing said elastic polymeric metallo-carboxylate with a material selected from the class consisting of carboxylic acids and their anhydrides having a greater —COOH content than said carboxyl-containing polymer until replasticization has occurred.

2. The method of replasticizing an elastic polymeric metallo-carboxylate prepared by the reaction of a polyvalent metal oxide with a plastic, rubbery, open-chain aliphatic conjugated diene polymer containing from 0.001 to 0.300 chemical equivalents of —COOH per 100 parts of polymer, which method comprises admixing said elastic polymeric metallo-carboxylate with a material selected from the class consisting of carboxylic acids and their anhydrides having a greater —COOH content than said polymer and masticating the resulting mixture until replasticization has occurred.

3. The method of replasticizing an elastic polymeric metallo-carboxylate prepared by the reaction of a polyvalent metal oxide with a plastic, rubbery carboxyl-containing polymeric material containing from 0.001 to 0.30 chemical equivalents by weight of combined —COOH per 100 parts by weight of polymeric material, said carboxyl-containing polymeric material being the product of the polymerization of a monomeric material comprising a major proportion of a butadiene-1,3 hydrocarbon and a minor proportion of a polymerizable olefinically-unsaturated carboxylic acid, which method comprises subdividing said polymeric metallo-carboxylate, adding to said subdivided material an acidic substance selected from the class consisting of carboxylic acid and carboxylic acid anhydrides having a greater —COOH content than said polymeric material, and working the resulting mixture until a smooth plastic composition obtains.

4. The method of replasticizing an elastic polymeric metallo-carboxylate prepared by the reaction of a polyvalent metal oxide with a plastic, rubbery polymeric material containing from 0.001 to 0.030 chemical equivalents by weight of combined —COOH per 100 parts by weight of polymeric material, said carboxyl-containing polymeric material being the product of the reaction of a hydrolysis agent with a plastic interpolymer of a monomeric mixture comprising a major proportion of a butadiene-1,3 hydrocarbon and a minor proportion of a copolymerizable monomer selected from the class consisting of polymerizable unsaturated esters, nitriles, and amides, which method comprises subdividing said polymeric metallo-carboxylate, adding to said subdivided material an acidic substance selected from the class consisting of carboxylic acids and carboxylic acid anhydrides having a greater —COOH content than said polymeric material, and working the resulting mixture until a smooth plastic composition obtains.

5. The method of replasticizing an elastic polymeric metallo-carboxylate prepared by the reaction of a polyvalent metal oxide with a plastic, rubbery polymeric material containing from 0.001 to 0.30 chemical equivalents by weight of combined —COOH per 100 parts by weight of polymeric material, said carboxyl-containing polymeric material being the product of the reaction of a carboxylating agent with a plastic polymer of a butadiene-1,3 hydrocarbon, which method comprises subdividing said elastic polymeric metallo-carboxylate, adding to said subdivided material a substance selected from the class consisting of carboxylic acids and carboxylic acid anhydrides having a greater —COOH content than said polymeric material, and masticating the resulting mixture until a smooth plastic composition obtains.

6. The method of replasticizing an elastic polymeric metallo-carboxylate derived from a condensation reaction between a polyvalent metal oxide and a plastic polymer of butadiene-1,3 and sorbic acid containing from 0.001 to 0.300 chemical equivalents by weight of —COOH per 100 parts of polymer, which method comprises subdividing said polymeric metallo-carboxylate, adding a carboxylic acid having a greater —COOH content than said plastic polymer to such subdivided material, and masticating the resulting mixture until a smooth plastic composition obtains.

7. The method of replasticizing an elastic polymeric metallo-carboxylate derived from a condensation reaction between a polyvalent metal oxide and a plastic polymer of butadiene-1,3 and methacrylic acid containing from 0.001 to 0.30 chemical equivalents by weight of combined —COOH per 100 parts of polymer, which method comprises subdividing said polymeric metallocarboxylate, adding a carboxylic acid having a greater —COOH content than said plastic polymer to said subdivided material, and masticating the resulting mixture until a smooth plastic composition obtains.

8. The method of replasticizing an elastic polymeric metallo-carboxylate derived from a condensation reaction between a polyvalent metal oxide and a plastic tripolymer containing from 0.001 to 0.30 chemical equivalents by weight of combined —COOH per 100 parts of tripolymer, said carboxyl-containing tripolymer being the product of the polymerization of a monomeric mixture consisting of from 50 to 94% by weight butadiene-1,3, 5 to 40% by weight of acrylonitrile and 1 to 45% by weight of methacrylic acid, which method comprises subdividing said polymeric metallo-carboxylate, adding a carboxylic acid having a greater —COOH content than said plastic tripolymer to said subdivided material, and masticating the resulting mixture until a smooth plastic composition is obtained.

9. The method of claim 4 in which the carboxyl-containing polymeric material is the product of the hydrolysis of a plastic copolymer derived from the polymerization of a monomeric mixture consisting of a major proportion of butadiene-1,3 and a minor proportion of acrylonitrile and the acidic substance utilized is phthalic anhydride.

10. The method of claim 5 in which the carboxyl-containing polymeric material is the product of the carboxylation of polybutadiene-1,3 and the acidic substance utilized is phthalic anhydride.

11. The method of claim 6 in which the plastic carboxyl-containing polymer is a copolymer resulting from the polymerization in acidic aqueous emulsion of a monomeric mixture consisting of from 70 to 99% by weight of butadiene-1,3 and from 1 to 30% by weight of sorbic acid and the carboxylic acid utilized is oxalic acid.

12. The method of claim 7 in which the plastic, carboxyl-containing polymer is a copolymer resulting from the polymerization in acidic aqueous emulsion of a monomeric mixture consisting of from 70 to 99% by weight of butadiene-1,3 and from 1 to 30% by weight of methacrylic acid and the carboxylic acid utilized is stearic acid.

13. The method of claim 8 in which the plastic, carboxyl-containing tripolymer is a tripolymer resulting from the polymerization in acidic aqueous emulsion of a monomeric mixture consisting of 55% by weight of butadiene-1,3, 35% by weight of acrylonitrile and 10% by weight of methacrylic acid and the carboxylic acid utilized is oxalic acid.

HAROLD P. BROWN.

REFERENCES CITED

The following references are of record in the file of this patent:

UNITED STATES PATENTS

| Number | Name | Date |
|---|---|---|
| 2,346,107 | Johnson | Apr. 4, 1944 |
| 2,395,506 | Sauser | Feb. 26, 1946 |